July 5, 1927.

F. HODGKINSON

SURFACE CONDENSER

Filed July 30, 1925

1,634,903

WITNESSES:

F. Hodgkinson
INVENTOR

BY

ATTORNEY

Patented July 5, 1927.

1,634,903

UNITED STATES PATENT OFFICE.

FRANCIS HODGKINSON, OF SWARTHMORE, PENNSYLVANIA, ASSIGNOR TO WESTINGHOUSE ELECTRIC & MANUFACTURING COMPANY, A CORPORATION OF PENNSYLVANIA.

SURFACE CONDENSER.

Application filed July 30, 1925. Serial No. 46,989.

My invention relates to surface condensers and has for an object to provide a condenser embodying the contra flow principle in which the number of passes of cooling media may be varied and in which, for each variation, a contra flow, of cooling media and vapor to be condensed may be maintained.

In service, a condenser may be called upon to operate under many varying conditions. The temperature or quantity of the available cooling water may vary quite widely. Then, again, extreme changes in load may take place. In some instances, a condenser normally supplied from natural sources may have to be supplied from a city main, possibly resulting in a considerable difference in temperature of cooling water. To meet these varying service conditions I have devised a condenser arranged to have cooling water pass therethrough in a variable manner.

According to my invention, means are provided for increasing or decreasing, the number of passes of cooling media, as conditions may require, in such a manner that a true contra flow relation between cooling media and condensable vapor is always maintained throughout the path of vapor travel. In order to attain this result, I divide the cooling tubes into groups and subgroups; the groups being connected in series or in parallel within the groups as conditions render necessary.

It is, therefore, an object of my invention to provide a condenser embodying the true contra flow principle in which means are provided for controlling the condensing effort exerted per unit of volume of cooling media.

Figure 1:
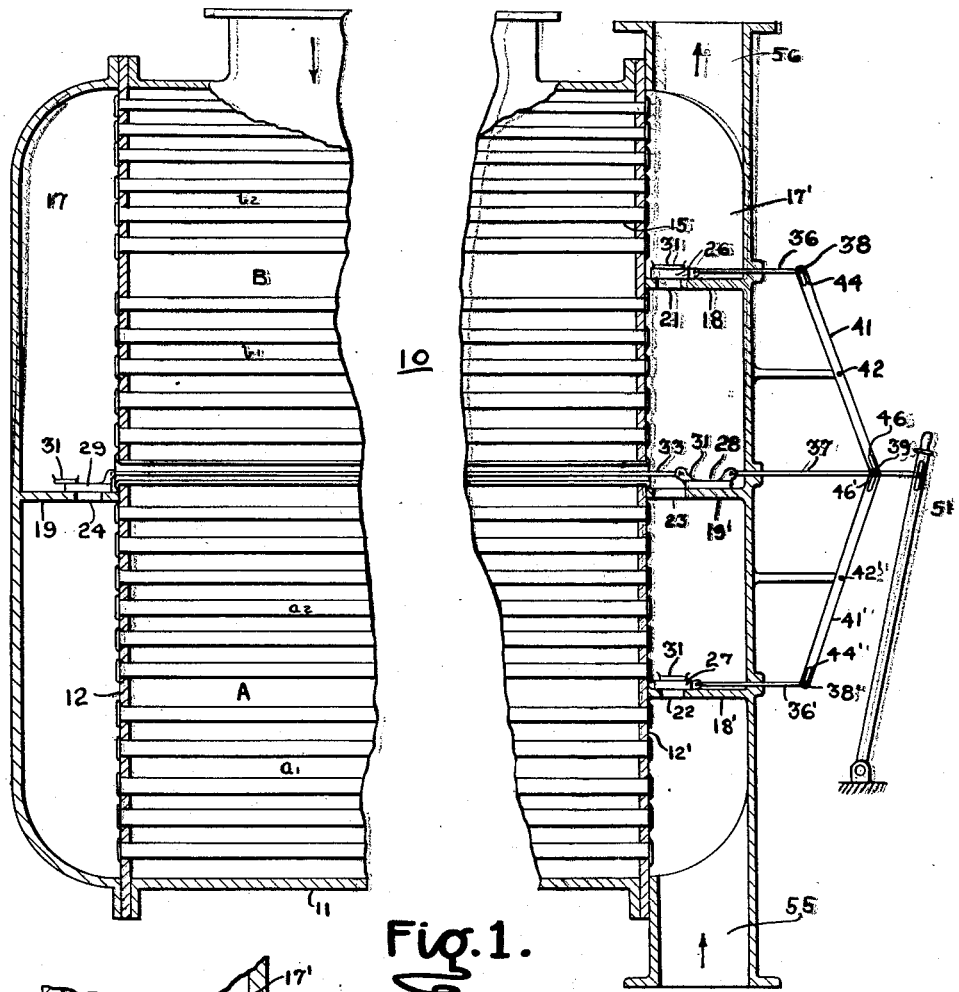
Figure 2:
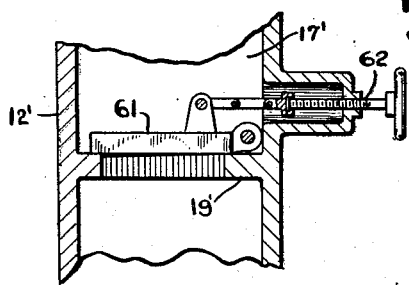
Figure 3:
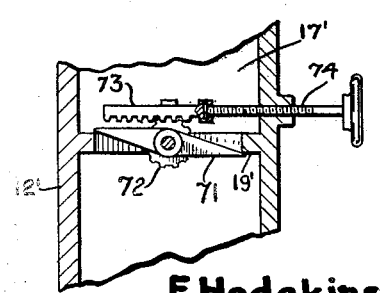

Another object of my invention is to provide a simple arrangement by which I am able to connect the different sub-groups in either parallel or series relation and to change the number of passes of cooling water while still maintaining a graduated temperature of cooling water throughout the path of vapor travel. Other and further objects of my invention will be apparent from the accompanying specification, having reference to the drawing in which, Fig. 1 is a vertical section through a condenser illustrating a specific embodiment of my invention and, Figs. 2 and 3 represent modifications of the valves controlling the flow of cooling water.

I am aware that surface condensers have been proposed in which the number of times the water passes through the condenser may be varied, such, for example, as that disclosed in the U. S. patent to Siegel, No. 1,206,605 dated November 28, 1916. My condenser differs from condensers of this type hitherto known in that under any conditions of operation the water in various passes has a gradually decreasing temperature from the steam admission portion to the portion in which the condensate is withdrawn. This insures a contra-flow of the fluid to be condensed with respect to the cooling water, resulting in the maximum effectiveness under any condition of operation.

In the present instance I have shown a condenser 10 as comprising a shell 11 provided with the usual hot well and openings for the withdrawal of condensate and non-condensable gases. These are of the conventional type and are accordingly not shown. At either end of the shell are tube plates 12, 12' between which extend tubes 15 as is common on condensers of this type. The tubes are divided into groups A and B. While I have shown only two groups it is to be understood that I may employ as many groups as is found desirable. The groups, are, in turn, divided into two or more sub-groups. In the present instance I have shown the group A divided into groups $a^1$ and $a^2$ and the group B into groups $b^1$ and $b^2$. Secured to the tube plates on the opposite side to the shell are water boxes 17, 17'. In the water box 17' are divisional plates 18, 18' opposite the boundaries between the sub-groups. In each of the water boxes there are division plates 19, 19' opposite the boundary between the groups of tubes. The division plates are provided with openings 21, 22, 23, and 24 situated in the partition plates 18, 18', 19' and 19 respectively and these openings may be closed by valves 26, 27, 28, and 29, respectively. I have shown these valves as held in sliding engagement with the partition walls by suitable members 31. The valves 28 and 29 are shown connected by a rod 33 extending through one of the tubes and are so arranged that when the opening 24 is closed by a valve the opening 23 will be opened. Valves 26 and 27 are operated by rods 36 and 36' respectively and valve 28 is operated by rod 37. Rods 36, 36' and 37 extend through the water box and are inter-connected as described below so that when port 23 is open ports 21, 22 and 24 will be closed.

In order to secure this intercontrol of the valves, the rods 36 and 36' are provided with pins 38 and 38' respectively and the rod 37 is provided with a pin 39. Levers 41 and 41' are pivoted as at 42, 42' to projections extending from the water box. These levers have slots 44 and 44' for engaging the pins 38 and 38' respectively and slots 46 and 46' for engaging the pin 39. The rod 37 is moved by any suitable mechanism such, for example, as a lever 51 and this, in turn, moves the valve 28, the rod 33 and the valve 29. At the same time, the pin 39 moves the levers 41 and 41' and transmits motion through the rods 36 and 36' to the valves 26 and 27.

In Fig. 1 I have shown the setting of the valves as it would be when there was a small amount of cooking water available, at which time the condenser would operate as a four pass condenser and therefore with greater effectiveness by virtue of the higher water velocity. The cooling water enters at 55, flows through the tubes in sub-groups $a^1$ to the portion of the water box 17 below the partition 19. The water then flows through the tubes of sub-groups $a^2$ to the portion of the water box 17' between the partition 18' and 19', through the opening 23 to the portion of the water box 17' between the partitions 18 and 19'. The water then flows through the tubes of the group $b^1$ to the portion of the water box 17 above the partition 19 back through the tubes of sub-group of $b^2$ to the upper portion of the water box 17' and is discharged through the opening 56.

In case an ample supply of water is available, the rod 37 is moved toward the condenser, closing the port 23 and opening the ports 21, 22 and 24. The flow of the water in this case is from the admission conduit 55 to the lower portion of the water box 17'. Here the water divides, a portion of it passing through the tubes of sub-group $a^1$ and a portion passing through the opening 22 and through the tubes of sub-groups $a^2$. These streams of water co-mingle in the lower portion of water box 17 and flow upwardly through the opening 24 to the upper portion of the water box 17. From thence it flows through the tubes of the group B to the upper portion of the water box 17' and out through the opening 56.

Although more convenient, it is not necessary that the valves be inter-connected so that they may be operated through a common means. Furthermore, other types of valves might be used in the partitions as shown in Figs. 2 and 3. In Fig. 2 I show a valve 61 pivotally mounted over a partition 19', the valve being operated by the rotation of a screw 62. In Fig. 3 I show a valve 71 of the butterfly type, the valve being operated through a pinion 72 by a rack 73 which is operated by the rotation of a screw 74. The valves shown in Figs. 2 and 3 have the advantage that they provide wider openings than those shown in Fig. 1 but they are not as readily adapted for movement by a common operating means, although this can be secured by a more elaborate mechanism. The mechanism for operating the valves, whether they be interconnected or not, may be carried out in a multiplicity of ways without affecting the underlying principles of my invention or the scope of the claims.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The combination in a condenser, of a casing, a plurality of groups of cooling tubes therein, each group being composed of a plurality of sub-groups, means for connecting the sub-groups of a group either in series or in parallel with respect to the flow of cooling fluid and means for connecting the groups in series in either case.

2. The combination in a condenser, of a casing, a plurality of groups of cooling tubes therein, each group being composed of a plurality of sub-groups, means for connecting the sub-groups of a group either in series or in parallel with respect to the flow of cooling fluid, said means comprising water boxes having valves in one opposite the boundary between the sub-groups of a group, and means for connecting the groups in series for either setting of the sub-groups valves, comprising a valve in each water box opposite the boundaries between the groups.

3. In a surface condenser, having a shell and water boxes, a plurality of groups of tubes extending between the water boxes, each group of tubes being composed of a plurality of sub-groups, partitions in each water box opposite the boundary between the groups, a partition in one of said water boxes opposite the boundary between the sub-groups of a group, said partitions being provided with openings, and valves for controlling said openings.

4. In a surface condenser, having a shell and water boxes, a plurality of groups of tubes for extending between the water boxes, each group of tubes being composed of a plurality of sub-groups, partitions in each water box opposite the boundary between the groups, a partition in one of said water boxes opposite the boundaries between the sub-groups of a group, said partitions being provided with openings, valves for controlling said openings, and means for concomitantly opening or closing all of the sub-group valves.

5. In a surface condenser, having a shell and water boxes, a plurality of groups of tubes extending between the water boxes, each group of tubes being composed of a plurality of sub-groups, partitions in each water box opposite the boundary between the groups, a partition in one of said water boxes opposite the boundaries between the sub-groups of a group, said partitions being provided with openings, valves for controlling said openings, and means for concomitantly opening one of the group valves and closing the opposite valve.

6. In a surface condenser, having a shell and water boxes, a plurality of groups of tubes extending between the water boxes, each group of tubes being composed of a plurality of sub-groups, partitions in each water box opposite the boundary between the groups, a partition in one of said water boxes opposite the boundaries between the sub-groups of a group, said partitions being provided with openings, valves for controlling said openings, and common means for opening all of said sub-group valves and one of the group valves and closing the opposite group valve or vice versa.

7. In a multipass condenser in which the passes are arranged to produce a progressively graduated temperature along the path of vapor travel, the combination of means for directing cooling media through the nest in two passes together with means for directing cooling media through the nest in more than two passes.

8. In a multipass condenser in which the passes are arranged to produce a progressively graduated temperature along the path of vapor travel, the combination of means for directing cooling media through the nest in a plurality of passes together with means for changing the number of passes.

9. In a multipass condenser in which the passes are arranged to produce a progressively graduated temperature along the path of vapor travel, the combination of means for directing cooling media through the nest in two passes together with means for directing cooling media through the nest in more than two passes, and common control means for rendering said first-named means ineffective and said second-named means effective.

10. In a multipass condenser in which the passes are arranged to produce a progressively graduated temperature along the path of vapor travel, the combination of means for directing cooling media through the nest in a variable number of passes together with a common control means for effecting a variation of said number of passes.

11. In a multipass condenser in which the passes are arranged to produce a progressively graduated temperature along the path of vapor travel, the combination of means for directing cooling media through the nest in a plurality of passes together with means for directing cooling media through the nest in a different number of passes and a common control means for controlling said first and said second-mentioned means, said first and said second-mentioned means being mutually responsive to said common control means.

12. In a multi-pass condenser in which the passes are arranged to produce a progressively graduated temperature along the path of vapor travel, the combination of means for directing cooling media through the nest in two passes together with means for directing cooling media through the nest in more than two passes, and common control means interconnected with said first and said second-mentioned means, thereby causing one of said first or said second-mentioned means to be effective causes the other of said first or said second-mentioned means to be ineffective.

In testimony whereof, I have hereunto subscribed my name this second day of July 1925.

FRANCIS HODGKINSON.